(12) United States Patent
Wu (10) Patent No.: US 12,108,427 B2
(45) Date of Patent: Oct. 1, 2024

(54) METHOD AND APPARATUS FOR DETERMINING SLOT FORMAT

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 296 days.

(21) Appl. No.: 17/544,362

(22) Filed: Dec. 7, 2021

(65) Prior Publication Data

US 2022/0104216 A1    Mar. 31, 2022

Related U.S. Application Data

(63) Continuation of application No. PCT/CN2020/074756, filed on Feb. 11, 2020.

(30) Foreign Application Priority Data

Nov. 8, 2019 (CN) .......................... 201911089865.9

(51) Int. Cl.
*H04W 72/50* (2023.01)
*H04W 72/1273* (2023.01)

(52) U.S. Cl.
CPC ..... *H04W 72/535* (2023.01); *H04W 72/1273* (2013.01)

(58) Field of Classification Search
None
See application file for complete search history.

(56) References Cited

U.S. PATENT DOCUMENTS

| 2018/0115970 A1* | 4/2018 | Chae | G08G 1/052 |
| 2019/0159137 A1* | 5/2019 | Zhang | H04W 52/146 |
| 2019/0268108 A1* | 8/2019 | Kim | H04W 56/0005 |
| 2019/0289637 A1* | 9/2019 | Jiang | H04L 1/1829 |

(Continued)

FOREIGN PATENT DOCUMENTS

| CN | 108476411 A | 8/2018 |
| CN | 109845372 A | 6/2019 |

(Continued)

OTHER PUBLICATIONS

Extended European Search Report for European Application No. 20884810.1, dated Jun. 27, 2022.

(Continued)

*Primary Examiner* — Phirin Sam
(74) *Attorney, Agent, or Firm* — Sheppard, Mullin, Richter & Hampton LLP (57) ABSTRACT

The implementations of the present disclosure relate to a method and apparatus for determining a slot format. The method includes: a terminal device determining a target time window on a first carrier, wherein the target time window includes at least one of the following: a discovery reference signal (DRS) transmission window and a channel occupancy time (COT) window, the DRS transmission window being used for transmitting a synchronization signal block (SSB); and the terminal device determining a slot format on the first carrier according to the target time window.

8 Claims, 3 Drawing Sheets

(56) References Cited

U.S. PATENT DOCUMENTS

| | | | |
|---|---|---|---|
| 2020/0053664 A1* | 2/2020 | Shi | H04W 52/365 |
| 2021/0006377 A1* | 1/2021 | Hooli | H04L 5/001 |
| 2022/0417775 A1* | 12/2022 | Cirik | H04L 1/0025 |

FOREIGN PATENT DOCUMENTS

| | | |
|---|---|---|
| CN | 110366264 A | 10/2019 |
| CN | 110691361 A | 1/2020 |
| CN | 110769501 A | 2/2020 |
| WO | WO 2019113766 A1 | 6/2019 |
| WO | WO 2019/194624 A1 | 10/2019 |

OTHER PUBLICATIONS

First Examination Report issued in Indian Patent Application No. 202117054570, dated Nov. 25, 2021.

Asustek, R1-1911212, Discussion on DL signals and channels, 3GPP TSG RAN WG1 #98bis, Chongqing, China, Oct. 14-20, 2019.

Motorola Mobility, Lenovo, R1-1911261, Feature lead summary for Nr-U DL Signals and Channels, 3GPP TSG RAN WG1#98bis, Chongqing, China, Aug. 14-20, 2019.

Google, RI-1911331, Discussion on DL signals and channels in NR unlicensed, 3GPP TSG RAN WGI #98b, Chongqing, China, Oct. 13-20, 2019.

EP Examination Report of European Patent Application No. 20884810.1, dated Feb. 21, 2023.

CN First Examination Report of Chinese Patent Application No. 202210112027.4, dated Mar. 30, 2023.

EP Examination Report of Patent Application 20884810.1, dated Jun. 29, 2023.

Notification to Grant an Invention Patent issued in Chinese Patent Application No. 202210112027.4, dated May 26, 2023.

International Search Report of PCT/CN2020/074756, mailed from China National Intellectual Property Administration on Jul. 30, 2020.

Vivo, "Discussion on the channel access procedures," R1- 1904065, 3GPP TSG RAN WG1 #96bis, Xi'an, China, Apr. 8-12, 2019.

NTT Docomo, Inc., "DL signals and channels for NR-U," R1-1911158, 3GPP TSG RAN WG1 #98bis, Chongqing, China, Oct. 14-20, 2019.

Notice of Reasons for Refusal and First Office Action of Japanese Application No. 2021-578136, dated Sep. 29, 2023.

* cited by examiner

| A terminal device determines a target time window on a first carrier, wherein the target time window at least includes one of the following: at least one of a Discovery Reference Signal (DRS) transmission window or a Channel Occupancy Time (COT) window, the DRS transmission window being used for transmitting a Synchronization Signal/PBCH Block (SSB) | — 210 |
|---|---|

| The terminal device determines a slot format on the first carrier according to the target time window | — 220 |
|---|---|

FIG. 3

A network device determines a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB), and the target time window being used for the terminal device to determine a slot format on the first carrier — 310

METHOD AND APPARATUS FOR DETERMINING SLOT FORMAT

CROSS-REFERENCE TO RELATED APPLICATION

The present application is a continuation application of International PCT Application No. PCT/CN2020/074756, filed on Feb. 11, 2020, which claims the priority to the Chinese Invention Application No. 201911089865.9 filed on Nov. 8, 2019, and entitled "Method and Apparatus for Determining Slot Format", the disclosure of both of which are incorporated by reference herein in their entireties.

TECHNICAL FIELD

The present disclosure relates to the field of communication, specifically to a method for determining a slot format, and an apparatus.

BACKGROUND

A data transmission on an unlicensed spectrum is supported in a New Radio (NR) system. When performing communication on the unlicensed spectrum, a communication device needs to follow a principle of Listen Before Talk (LBT), that is, before sending a signal on a channel of the unlicensed spectrum, the communication device needs to perform channel listening (or referred to as a channel detection) first, and only when a result of channel listening is that the channel is idle, can the communication device send the signal. If the result of channel listening performed by the communication device on the unlicensed spectrum is that the channel is busy, the signal cannot be sent.

For an NR-Based Access to Unlicensed Spectrum (NR-U) system for which a network is deployed on an unlicensed spectrum, a communication transmission in the NR-U system is an opportunistic transmission due to the LBT. How to determine a slot format in the NR-U system is not clearly defined at present.

SUMMARY

Implementations of the present disclosure provide a method for determining a slot format, and an apparatus, which may dynamically realize a determination of a slot format in an NR-U system.

In a first aspect, a method for determining a slot format is provided, which includes: determining, by a terminal device, a target time window on a first carrier, wherein the target time window at least includes one of the following: a Discovery Reference Signal (DRS) transmission window or a Channel Occupancy Time (COT) window, the DRS transmission window being used for transmitting a Synchronization Signal/PBCH Block (SSB); and determining, by the terminal device, the slot format on the first carrier according to the target time window.

In a second aspect, a method for determining a slot format is provided, which includes: determining, by a network device, a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB), and the target time window is used for the terminal device to determine the slot format on the first carrier.

In a third aspect, an apparatus for determining a slot format is provided, which is located in a terminal device, and includes: a first determining module, configured to determine a target time window on a first carrier, wherein the target time window at least includes one of the following: a Discovery Reference Signal (DRS) transmission window or a Channel Occupancy Time (COT) window, the DRS transmission window being used for transmitting a Synchronization Signal/PBCH Block (SSB); and a second determining module, configured to determine the slot format on the first carrier according to the target time window.

In a fourth aspect, an apparatus for determining a slot format is provided, which is located in a network device, and includes: a fifth determining module, configured to determine a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB), and the target time window is used for the terminal device to determine the slot format on the first carrier.

In a seventh aspect, an electrical apparatus is provided, which is configured to implement the method according to any one of the first to second aspects described above or any of various implementations thereof.

Specifically, the apparatus includes a processor, configured to call and run a computer program from a memory, to cause the apparatus to perform the method according to any one of the first to second aspects described above or any of various implementations thereof.

Optionally, the apparatus is a chip.

In an eighth aspect, a computer readable storage medium is provided, which is configured to store a computer program, wherein the computer program causes a computer to perform the method according to any one of the first to second aspects described above or any of various implementations thereof.

In a ninth aspect, a computer program product is provided, which includes computer program instructions, wherein the computer program instructions cause a computer to perform the method according to any one of the first to second aspects described above or any of various implementations thereof.

In a tenth aspect, a computer program is provided, wherein when the computer program is run on a computer, the computer is caused to perform the method according to any one of the first to second aspects described above or any of various implementations thereof.

According to the above technical solutions, a terminal device determines a target time window on a first carrier, wherein the target time window includes at least one of a Discovery Reference Signal (DRS) transmission window or a Channel Occupancy Time (COT) window, and the terminal device determines a slot format on the first carrier according to the DRS transmission window and/or the COT window, so that a determination of a slot format in an NR-U system may be dynamically realized.

DETAILED DESCRIPTION

Technical solutions in implementations of the present disclosure will be described below with reference to the drawings in the implementations of the present disclosure. It is apparent that the implementations described are a part of implementations of the present disclosure, but not all of the implementations. According to the implementations of the present disclosure, all other implementations achieved by a person of ordinary skill in the art without making inventive efforts belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system, or another communication system, etc.

Figure 1:
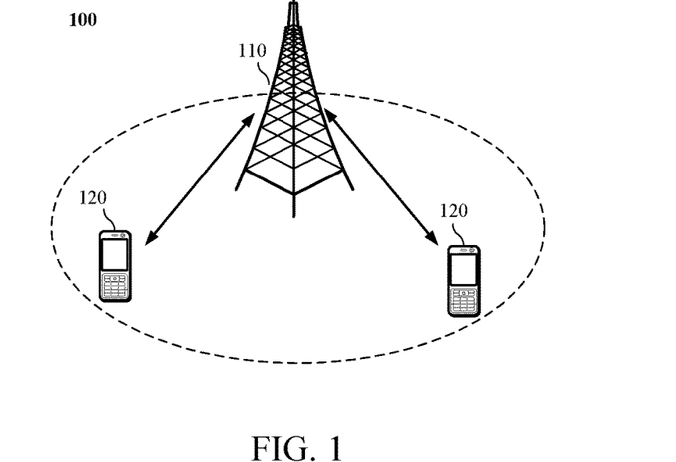
FIG. 1 is a schematic diagram of an architecture of a communication system 100 according to an implementation of the present disclosure.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. As used herein, the "terminal device" includes, but is not limited to, an apparatus configured to receive/send a communication signal via a connection of a wired circuit, for example, via a connection of Public Switched Telephone Networks (PSTN), a Digital Subscriber Line (DSL), a digital cable, or a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast sender; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, etc.

Optionally, Device to Device (D2D) communication may be performed between the terminal devices 120.

Optionally, the 5G system or the 5G network may also be referred to as a New Radio (NR) system or an NR network.

FIG. 1 illustratively shows one network device and two terminal devices. Optionally, the communication system 100 may include multiple network devices, and another quantity of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include another device in the communication system 100, for example another network entity, such as a network controller, or a mobile management entity, etc., which is not limited in the implementations of the present disclosure.

It should be understood that the terms "system" and "network" herein are often used interchangeably herein.

A flexible slot format is proposed in an NR system, in which the slot format may be expressed as information of a downlink symbol, a flexible symbol, and an uplink symbol included in one slot. Such a slot constitution may be called different slot formats (SFs).

Currently, an NR protocol may support up to 256 slot formats, of which 25 slot formats are shown in Table 1. In the Table 1, one line represents one slot format, "D" represents a downlink symbol, "U" represents an uplink symbol, and "F" represents a flexible symbol. It may be seen that slot format 0 indicates that 14 symbols in one slot are all downlink symbols, slot format 1 indicates that 14 symbols in one slot are all uplink symbols, and slot format 20 indicates that first 2 symbols in one slot are configured as downlink symbols, last one symbol is configured as an uplink symbol, and middle 11 symbols are configured as flexible symbols.

TABLE 1

| Slot format | Number of a quantity of symbols of a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

In the NR system, Slot format indicator (SFI) information may be transmitted through a Group-common Physical Downlink Control Channel (GC-PDCCH), and a corresponding Downlink Control Information (DCI) format is DCI format 2-0. A Cyclic Redundancy Check (CRC) corresponding to the DCI format 2-0 may be scrambled by an SFI-Radio Network Temporary Identity (RNTI), wherein, the SFI-RNTI may be configured by a high layer.

A size of the DCI format 2-0 may be configured by a high layer, and a maximum quantity of bits of the DCI format 2-0 is 128 bits. One DCI format 2-0 may include SFI information of one cell or a group of cells. Specifically, DCI information transmitted by DCI format 2-1 may be as follows:

SFI 1, SFI 2, . . . , SFI N

Herein, the SFI 1 represents SFI information of cell 1, the SFI 2 represents SFI information of cell 2, . . . , the SFI N represents SFI information of cell N. A size of one SFI-index field (for example, the SFI 1) may be 9 bits, which is used for indicating one slot format combination identity.

For each cell, the terminal device may be configured with the following information: an identity of a cell, a position of an SFI-index domain in the DCI format 2-0, a slot format combination set, and a reference subcarrier interval. Herein, each slot format combination in the slot format combination set may include a slot format combination identity and at least one slot format indicator, and the slot format combination identity corresponds to the at least one slot format indicator. For the reference subcarrier interval, if it is in an unpaired spectrum operation mode, the reference subcarrier interval may be a reference subcarrier interval corresponding to a normal uplink carrier or a supplementary uplink carrier; and if it is in a paired spectrum operation mode, the reference subcarrier interval may be a reference subcarrier interval corresponding to a Downlink (DL) BandWidth Part (BWP) or an Uplink (UL) BWP.

In a process that the terminal device determines a slot format of the cell 1, specifically, after detecting the DCI format 2-0 according to the SFI-RNTI, the terminal device may find the identity of the cell 1 according to a parameter configured by a high layer, and determine a starting position of an SFI-index domain of the cell 1 in the detected DCI format 2-0. Then, the terminal device may read one SFI-index domain starting from the starting position, and determine the slot format of the cell 1 from the slot format combination set configured by the high layer according to the slot format combination identity indicated by the SFI-index domain. Generally, a time length of the slot format determined by the terminal device in the above mode is greater than or equal to a detection period of a PDCCH for carrying the DCI format 2-0. That is to say, it is possible for the terminal device to receive two pieces of SFI indication information at two different times, and it is possible that time lengths indicated by the two pieces of SFI indication information partially overlap, wherein slot formats indicated by the two pieces of SFI indication information are same on the overlapping time length.

In order to deepen understanding of the implementations of the present disclosure, an unlicensed spectrum is briefly introduced below.

The unlicensed spectrum is a spectrum that may be used for radio device communication divided by countries and regions. The spectrum may be considered as a shared spectrum, that is, communication devices in different communication systems may use the spectrum, and may not apply for exclusive spectrum authorization from a government, as long as they meet a regulatory requirement on the spectrum set by the countries or the regions. In order to enable various communication systems using the unlicensed spectrum for wireless communication to coexist friendly on the spectrum, a principle of Listen Before Talk (LBT) needs to be based, that is, before a communication device sends a signal on a channel of the unlicensed spectrum, channel listening (or referred to as a channel detection) needs to be performed first, and only when a result of channel listening is that the channel is idle, can the communication device send the signal. If the result of channel listening performed by the communication device on the unlicensed spectrum is that the channel is busy, the signal cannot be sent. And in order to ensure fairness, in one transmission, a duration of a signal transmission performed by the communication device using the channel on the unlicensed spectrum may not exceed a Maximum Channel Occupation Time (MCOT).

Figure 2:
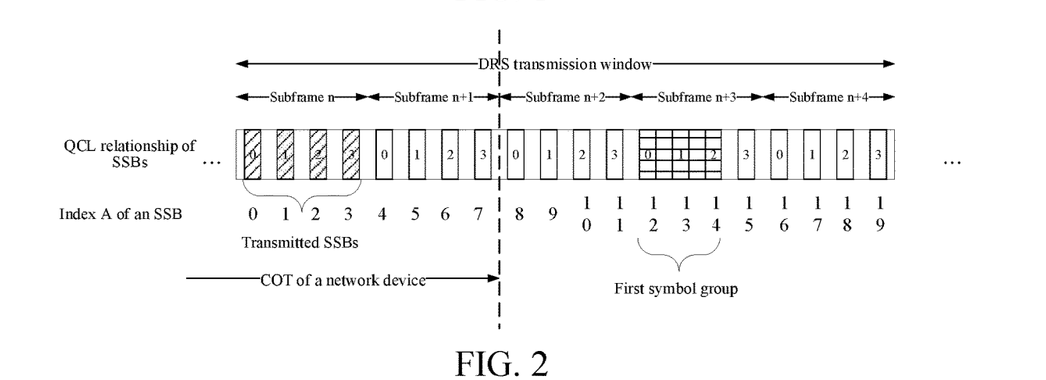
FIG. 2 is a schematic diagram of a downlink transmission in an LAA-LTE system.

In a process of a downlink signal transmission in a Licensed-Assisted Access (LAA)-LTE system, as shown in FIG. 2, if the LBT of a network device fails, a signal transmission cannot be performed. If the LBT of the network device is successful, the network device may perform a downlink transmission with one time of transmission opportunity not exceeding the MCOT. Herein, one time of downlink transmission opportunity may be defined as a time unit of a continuous transmission of the network device.

Since a transmission of the network device is opportunistic, the transmission can only be performed if the LBT succeeds, and cannot be performed if the LBT fails. Therefore, in order to realize a correct data communication with the network device, the terminal device in the cell served by the network device needs to determine when the network device starts and stops the downlink transmission. To solve this problem, in an LAA-LTE system, a Cell-specific Reference Signals (CRS) may exist on each subframe sent by the network device, so that the terminal device may judge, by detecting whether a CRS exists on a current subframe, whether there is a downlink transmission of the network device on this subframe. With reference to FIG. 2, the network device may indicate an ending position of the downlink transmission by transmitting Downlink Control Information (DCI) on a last subframe and a last second subframe of the downlink transmission, wherein the DCI includes indication information of a symbol corresponding to the ending position of the downlink transmission. In addition, in the LAA-LTE system, when the network device initiates one COT, only one uplink and downlink switching point is allowed in the COT, so a downlink transmission and a possible existing uplink transmission within the COT are both continuous, and the terminal device is likely to determine a slot structure within the COT, only needing to determine a downlink ending position and an uplink COT. Since LAA-LTE does not support an independent network deployment, there may be no resource for a system information transmission on an LAA-LTE carrier.

However, for the NR-U system, since it inherits a flexible slot configuration of NR, and supports multiple uplink and downlink switching points included within a COT, thus it also supports a more flexible slot format. Furthermore, the NR-U system supports the independent network deployment, so it is necessary to consider transmitting system information related to initial access on an NR-U carrier. In this scenario, based on being similar to DCI format 2-0 of the NR system, how to determine a slot format in the NR-U system has not been clearly defined at present. In order to solve the above problems, an implementation of the present disclosure provides a method for determining a slot format, which may effectively realize a determination of a slot format in the NR-U system.

Figure 3:
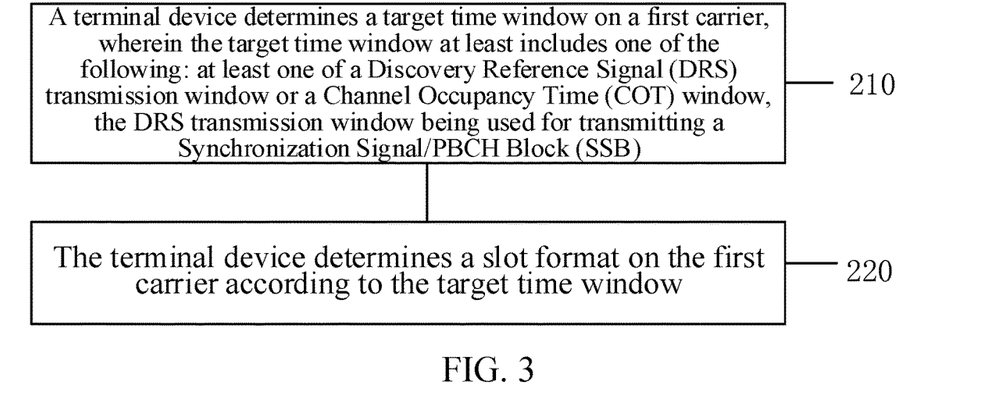
FIG. 3 is a schematic flowchart of a method 200 for determining a slot format according to an implementation of the present disclosure.

FIG. 3 is a schematic flowchart of a method 200 for determining a slot format according to an implementation of the present disclosure. The method described in FIG. 3 may be performed by a terminal device and a network device, the terminal device may be, for example, the terminal device 120 shown in FIG. 1, and the network device may be, for example, the network device 110 shown in FIG. 1. As shown in FIG. 3, the method 200 may include at least part of the following contents.

In 210, a terminal device determines a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB).

In 220, the terminal device determines a slot format on the first carrier according to the target time window.

Optionally, the terminal device receives first indication information sent by a network device. The terminal device determines the DRS window according to the received first indication information, wherein the first indication information includes at least one of length indication information of the DRS transmission window or starting position indication information of the DRS transmission window.

Optionally, the terminal device determines the DRS transmission window according to a preset rule.

Optionally, the terminal device receives second indication information sent by the network device. The terminal device determines the COT window according to the received second indication information, wherein the second indication information includes at least one of length indication information of the COT window, slot structure indication information, or channel access priority indication information corresponding to the COT, wherein a channel access priority corresponding to the COT is used for determining a length of the COT window.

It should be understood that the term "and/or" herein is merely an association relationship describing associated objects, indicating that three relationships may exist, for example, A and/or B may indicate three situations: A alone, both A and B, and B alone.

In an implementation of the present disclosure, the network device may send the first indication information and/or the second indication information to the terminal device through an unlicensed carrier, or may send the first indication information and/or the second indication information to the terminal device through a licensed carrier. Accordingly, the terminal device may receive the first indication information and/or the second indication information sent by the network device through the unlicensed carrier, or may receive the first indication information and/or the second indication information through the licensed carrier.

An LBT mode on an unlicensed spectrum may include a channel access device type of LBE and a channel access device type of FBE. Herein, the LBE means that the communication device may perform a channel detection on the unlicensed spectrum after a service arrives, and start sending of a signal after the channel detection is successful. The FBE means that the communication device may periodically perform channel detections, and channel resources that are likely to be used for sending of the service also appear periodically.

Optionally, the network device or the terminal device needs to perform LBT before starting a transmission on a first carrier, and perform a downlink or uplink transmission after the LBT is successful.

Optionally, in an implementation of the present disclosure, a high layer configuration parameter includes Radio Resource Control (RRC) information or Media Access Control (MAC) Control Element (CE) information.

Optionally, in an implementation of the present disclosure, the first indication information may be the high layer configuration parameter.

Optionally, in an implementation of the present disclosure, the second indication information may be a physical layer signaling and/or the high layer configuration parameter.

It should be understood that specific examples in the implementations of the present disclosure are only intended to help those skilled in the art to better understand the implementations of the present disclosure, but not to limit the scope of the implementations of the present disclosure. The technical solutions of the implementation of the present disclosure are described in detail below, but the present disclosure is not limited to this.

In an implementation of the present disclosure, a preconfigured downlink transmission includes at least one of a Channel State Information Reference Signal (CSI-RS) or a Physical Downlink Shared Channel (PDSCH).

In an implementation of the present disclosure, a preconfigured uplink transmission includes at least one of a Sounding Reference Signal (SRS), a Physical Uplink Control Channel (PUCCH), a Physical Uplink Shared Channel (PUSCH), or a Physical Random Access Channel (PRACH).

In an implementation of the present disclosure, a random access channel resource includes at least one of a PRACH transmission opportunity or a PUSCH transmission opportunity. It should be understood that in a traditional four-step random access procedure, a random access channel resource includes a PRACH transmission opportunity. In an enhanced two-step random access procedure, the random access channel resource may include the PRACH transmission opportunity and/or the PUSCH transmission opportunity.

Optionally, in an implementation of the present disclosure, an SSB within a DRS transmission window may have multiple candidate positions, wherein each candidate position may be regarded as one SSB candidate resource. The terminal device may determine a QCL relationship of at least two SSB candidate positions among the multiple SSB candidate positions according to a Q value, and determine reception of the SSB according to the QCL relationship. When the network device sends the SSB within a DRS transmission window, it may make multiple attempts of the LBT, and after the LBT is successful, it may transmit the SSB through determining at least one candidate position, which obtains a right to use a channel, according to the QCL relationship among the multiple candidate positions. Herein, a value range of Q is {1, 2, 4, 8}. Herein, the multiple SSB candidate resources are to provide more transmission opportunities for the transmission of the SSB, and a quantity of SSBs actually sent may be smaller than a quantity of SSB candidate resources.

Specifically, the terminal device may assume that SSBs sent at SSB candidate positions with a same QCL relationship have a same QCL relationship, or if the network device sends the SSBs at the SSB candidate positions with the same QCL relationship, the network device should use a same beam. Optionally, the SSB candidate positions with a same mod (A, Q) have the same QCL relationship, wherein A is an index of the SSB candidate position, or A is an index of the SSB. Optionally, the Q value is indicated by the network device to the terminal device, or the Q value is preset.

In an implementation of the present disclosure, the terminal device determines the slot format on the first carrier according to the target time window, including at least part of the following situations.

(a) The target time window includes a DRS transmission window, wherein the DRS transmission window includes a first symbol group in a first slot.

In a possible implementation, if the terminal device is configured to receive a preconfigured downlink transmission on the first symbol group in the first slot, the terminal device cancels receiving the preconfigured downlink transmission on the first symbol group in the first slot, or the terminal device cancels receiving the preconfigured downlink transmission on the first slot.

In a possible implementation, if the terminal device is configured to send a preconfigured uplink transmission on the first symbol group in the first slot, the terminal device cancels sending the preconfigured uplink transmission on the first symbol group in the first slot, or the terminal device cancels sending the preconfigured uplink transmission on the first slot.

In a possible implementation, if the terminal device determines that a random access channel resource which is configured is located on the first symbol group in the first slot, the terminal device determines that the random access channel resource is not a valid random access channel resource.

(b) The target time window includes a DRS transmission window, wherein the DRS transmission window includes a first symbol group in a first slot, and the terminal device determines that the first symbol group or the first slot is not used for the transmission of the SSB.

Optionally, the terminal device determines that the first symbol group or the first slot is not used for the transmission of the SSB, including: the terminal device may determine whether the first symbol group or the first slot is used for the transmission of the SSB through an explicit indication or an implicit indication of the network device, or through an SSB blind detection.

In a possible implementation, if the terminal device is configured to receive a preconfigured downlink transmission on the first symbol group in the first slot, the terminal device receives the preconfigured downlink transmission on the first symbol group in the first slot.

In a possible implementation, if the terminal device is configured to send a preconfigured uplink transmission on the first symbol group in the first slot, the terminal device allows to send the preconfigured uplink transmission on the first symbol group in the first slot.

In a possible implementation, if the terminal device determines that a random access channel resource which is configured is located on the first symbol group in the first slot, the terminal device determines that the random access channel resource is a valid random access channel resource.

Optionally, the terminal device allows to send the preconfigured uplink transmission on the first symbol group in the first slot, specifically referring to that: if the terminal device obtains a right to use a channel on the first symbol group in the first slot, for example, a channel detection (LBT) is successful, the terminal device sends the preconfigured uplink transmission on the first symbol group in the first slot.

(c) The target time window includes a DRS transmission window and a COT window, wherein the COT window is a COT window initiated by the network device, and a first symbol group in a first slot is located in the DRS transmission window, but not within the COT. FIG. 3 shows an example of this scenario.

In a possible implementation, if the terminal device is configured to receive a preconfigured downlink transmission on the first symbol group in the first slot, the terminal device cancels receiving the preconfigured downlink transmission on the first symbol group in the first slot, or the terminal device cancels receiving the preconfigured downlink transmission on the first slot.

In a possible implementation, if the terminal device is configured to receive a preconfigured downlink transmission on the first symbol group in the first slot, the terminal device allows to receive the preconfigured downlink transmission on the first symbol group in the first slot.

In a possible implementation, if the terminal device is configured to send a preconfigured uplink transmission on the first symbol group in the first slot, the terminal device allows to send the preconfigured uplink transmission on the first symbol group in the first slot.

In a possible implementation, if the terminal device determines that a random access channel resource which is configured is located on the first symbol group in the first slot, the terminal device determines that the random access channel resource is a valid random access channel resource.

Optionally, the terminal device allows to send the preconfigured uplink transmission on the first symbol group in the first slot, specifically referring to that: if the terminal device obtains a right to use a channel on the first symbol group in the first slot, for example, a channel detection (LBT) is successful, then the terminal device sends the preconfigured uplink transmission on the first symbol group in the first slot.

Optionally, the terminal device allows to receive the preconfigured downlink transmission on the first symbol group in the first slot, specifically referring to that: the terminal device detects whether there is a preconfigured downlink transmission sent by the network device on the first symbol group in the first slot.

(d) The target time window includes a COT window, wherein the COT window is a COT window initiated by the network device, and includes a second symbol group in a second slot.

In a possible implementation, if the terminal device is configured to receive a preconfigured downlink transmission on the second symbol group in the second slot, and the terminal device determines that a symbol in the second symbol group is not a downlink symbol, the terminal device cancels receiving the preconfigured downlink transmission on the second symbol group in the second slot, or the terminal device cancels receiving the preconfigured downlink transmission on the second slot.

In a possible implementation, if the terminal device is configured to receive a preconfigured downlink transmission on the second symbol group in the second slot, and the terminal device determines that a symbol in the second symbol group is a downlink symbol, the terminal device receives the preconfigured downlink transmission on the second symbol group in the second slot.

In a possible implementation, if the terminal device is configured to send a preconfigured uplink transmission on the second symbol group in the second slot, and the terminal device determines that a symbol in the second symbol group is not an uplink symbol, the terminal device cancels sending the preconfigured uplink transmission on the second symbol group in the second slot, or the terminal device cancels sending the preconfigured uplink transmission on the second slot.

In a possible implementation, if the terminal device is configured to send a preconfigured uplink transmission on the second symbol group in the second slot, and the terminal device determines that a symbol in the second symbol group is an uplink symbol, the terminal device allows to send the preconfigured uplink transmission on the second symbol group in the second slot.

In a possible implementation, if the terminal device determines that a random access channel resource which is configured is located on the second symbol group in the second slot, and the terminal device determines that a symbol in the second symbol group is not an uplink symbol, then the terminal device determines that the random access channel resource is not a valid random access channel resource.

In a possible implementation, if the terminal device determines that a random access channel resource which is configured is located on the second symbol group in the second slot, and the terminal device determines that a symbol in the second symbol group is an uplink symbol, then the terminal device determines that the random access channel resource is a valid random access channel resource.

Optionally, the terminal device determines a symbol type of a symbol in the second symbol group according to slot structure indication information, such as SFI indication information, sent by the network device, wherein a symbol type of the second symbol group includes one of a "downlink symbol", an "uplink symbol", or a "flexible symbol".

Optionally, the terminal device allows to send the preconfigured uplink transmission on the second symbol group in the second slot, specifically referring to that: if the terminal device obtains a right to use a channel on the second symbol group in the second slot, such as a channel detection (LBT) is successful, the terminal device sends the preconfigured uplink transmission on the second symbol group in the second slot.

Optionally, when a symbol in the second symbol group in the second slot is within a COT initiated by a network device, the terminal device (a UE) should meet at least one of the following rules for determining the slot format.

For the second symbol group in the second slot, the UE does not expect to detect that an SFI-index field in DCI format 2_0 indicates that the group of symbol in the slot is uplink, or to detect that DCI format 1_0, DCI format 1_1, or DCI format 0_1 indicates that the UE receives a PDSCH or a CSI-RS on the group of symbol in the slot.

For the second symbol group in the second slot, the UE does not expect to detect that an SFI-index field in the DCI Format 2_0 indicates that the group of symbol in the slot is downlink, or to detect that DCI Format 0_0, the DCI Format 0_1, the DCI Format 1_0, the DCI Format 1_1, DCI Format 2_3, or an RAR uplink grant indicates that the UE sends a PUSCH, a PUCCH, a PRACH, or an SRS on the group of symbol in the slot.

For the second symbol group in the second slot, if it is indicated as downlink/uplink by tdd-UL-DL-ConfigurationCommon or tdd-UL-DL-ConfigurationDedicated, the UE does not expect to detect that an SFI-index field in the DCI format 2_0 indicates that the group of symbols in the slot are uplink/downlink respectively, or indicates that they are flexible.

For the second symbol group in the second slot, if it is indicated as SS/PBCK block reception by ssb-PositionsInBurst in SIB1 or ssb-PositionsInBurst in ServingCellConfigCommon, the UE does not expect to detect that an SFI-index field in the DCI format 2_0 indicates that the group of symbol in the slot is uplink.

For the second symbol group in the second slot, if it corresponds to one valid PRACH opportunity and there are $N_{gap}$ symbols before the valid PRACH opportunity, the UE does not expect to detect that an SFI-index field in the DCI format 2_0 indicates that the group of symbol in the slot is downlink.

For the second symbol group in the second slot, if it is indicated as a CORESET of Type0-PDCCH CSS by pdcch-ConfigSIB1 in MIB, the UE does not expect to detect that an SFI-index field in the DCI format 2_0 indicates that the group of symbol in the slot is uplink.

For the second symbol group in the second slot, if it is indicated as flexible by configured tdd-UL-DL-ConfigurationCommon and tdd-UL-DL-configuration-Dedicated, or when there is no configured tdd-UL-DL-ConfigurationCommon or tdd-UL-DL-configurationDedicated, and if the UE detects that an SFI-index field in the DCI format 2_0 indicates a slot format indication value except 255.

- If one or more symbols in the group of symbols are symbols in a CORESET configured for the UE for PDCCH monitoring, the UE receives a PDCCH in the CORESET only in a case where an SFI-index field in the DCI format 2_0 indicates that the one or more symbols are downlink symbols.
- If an SFI-index field in the DCI format 2_0 indicates that the group of symbol in the slot is flexible, and the UE detects that the DCI format 1_0, the DCI format 1_1, or the DCI format 0_1 indicates that the UE receives a PDSCH or a CSI-RS on the group of symbol in the slot, then the UE receives the PDSCH or the CSI-RS on the group of symbol in the slot.
- If an SFI-index field in the DCI format 2_0 indicates that the group of symbol in the slot is flexible, and the UE detects the DCI format 0_0, the DCI format 0_1, the DCI format 1_0, the DCI format 1_1, the DCI format 2_3, or the RAR uplink grant indicates that the UE sends a PUSCH, a PUCCH, a PRACH, or an SRS on the group of symbol in the slot, then the UE sends the PUSCH, the PUCCH, the PRACH, or the SRS on the group of symbol in the slot.
- If an SFI-index field in the DCI format 2_0 indicates that the group of symbol in the slot is flexible, and the UE does not detect that the DCI format 1_0, the DCI format 1_1, or the DCI format 0_1 indicates that the UE receives a PDSCH or a CSI-RS on the group of symbol in the slot, or the UE does not detect that the DCI format 0_0, the DCI format 0_1, the DCI format 1_0, the DCI format 1_1, the DCI format 2_3, or the RAR uplink grant indicates that the UE sends a PUSCH, a PUCCH, a PRACH, or an SRS on the group of symbol in the slot, then the UE does not perform sending or receiving on the group of symbol in the slot.
- If the UE is configured by a high layer to receive a PDSCH or a CSI-RS on the group of symbol in the slot, the UE receives the PDSCH or the CSI-RS on the group of symbol in the slot only in a case where an SFI-index field in the DCI format 2_0 indicates that the group of symbol in the slot is downlink.
- If the UE is configured by a high layer to send a PUCCH, a PUSCH, or a PRACH on the group of symbol in the slot, the UE sends the PUCCH, the PUSCH, or the PRACH on the slot only in a case where an SFI-index field in the DCI format 2_0 indicates that the group of symbol in the slot is uplink.
- If the UE is configured by a high layer to send an SRS on the group of symbols in the slot, the UE sends the SRS only in a case where an SFI-index field in the DCI format 2_0 indicates that a group of subset symbol of the group of symbols in the slot is an uplink symbol.
- The UE does not expect to detect that an SFI-index field in the DCI format 2_0 indicates that the group of symbols in the slot are downlink, or also detects that the DCI format 0_0, the DCI format 0_1, the DCI format 1_0, the DCI format 1_1, the DCI format 2_3, or the RAR uplink grant indicates that the UE sends an SRS, a PUSCH, a PUCCH, or a PRACH on one or more symbols in the group of symbols in the slot.
- The UE does not expect to detect that an SFI-index field in the DCI format 2_0 indicates that the group of symbols in the slot are downlink or flexible, if the group of symbols in the slot include symbols in a PUSCH repeated transmission activated by an uplink Type 2 grant PDCCH.
- The UE does not expect to detect that an SFI-index field in the DCI format 2_0 indicates that the group of symbols in the slot are uplink, or also detects that the DCI format 1_0, the DCI format 1_1, or the DCI format 0_1 indicates that the UE receives a PDSCH or a CSI-RS on one or more symbols in the group of symbols in the slot.
- If the UE is configured by a high layer to receive a CSI-RS or a PDSCH on the group of symbols in the slot, and the UE detects that an SFI-index field in the DCI format 2_0 indicates that a slot format indication value except 255 indicates that a subset symbol in the group of symbols is uplink or flexible, or the UE detects that the DCI format 0_0, the DCI format 0_1, the DCI format 1_0, and the DCI format 1_1, or the DCI format 2_3 indicates that the UE sends a PUSCH, a PUCCH, an SRS, or a PRACH on at least one symbol in the group of symbols, then the UE cancels receiving the CSI-RS on the group of symbols in the slot, or cancels receiving the PDSCH on the slot.
- If the UE is configured by a high layer to send an SRS, a PUCCH, a PUSCH, or a PRACH on the group of symbols in the slot, and the UE detects that an SFI-index field in the DCI format 2_0 indicates that a slot format indication value except 255 indicates that a subset symbol in the group of symbols is downlink or flexible, or the UE detects that the DCI format 1_0, the DCI format 1_1, or the DCI format 0_1 indicates that the UE receives a PDSCH or a CSI-RS on the subset symbol in the group of symbols, then it is as follows.
  - The UE does not expect to cancel a transmission on a symbol in the group of symbols in the slot that occurs within a processing time $T_{proc,\,2}$ after an end of UE detecting a last symbol of CORESET in DCI format 1_0, DCI format 1_1, or DCI format 0_1.
  - The UE cancels a PUSCH, PUCCH, or PRACH transmission on remaining symbols in the group of symbols, and cancels an SRS transmission on the remaining symbols in the group of subset symbols.
- If the UE does not detect that an SFI-index field in the DCI format 2_0 indicates that a second symbol group in a second slot is flexible or uplink, and the UE does not detect that the DCI format 0_0, the DCI format 0_1, the DCI format 1_0, the DCI format 1_1, or the DCI format 2_3 indicates that the UE sends an SRS, a PUSCH, a PUCCH, or a PRACH in the group of symbol, then the UE assumes that a flexible symbol in a CORESET configured for the UE for PDCCH monitoring is a downlink symbol.

For the second symbol group in the second slot, if it is indicated as flexible by configured tdd-UL-DL-ConfigurationCommon and tdd-UL-DL-Configuration-Dedicated, or when there is no configured tdd-UL-DL-ConfigurationCommon and tdd-UL-DL-ConfigurationDedicated, and if the UE does not detect the DCI format 2_0 indicating a slot format of the slot, it is as follows.

If the UE receives an indication in the DCI format 1_0, the DCI format 1_1, or the DCI format 0_1, the UE may receive a PDSCH or a CSI-RS on the group of symbol in the slot according to the indication.

If the UE receives an indication in the DCI format 0_0, the DCI format 0_1, the DCI format 1_0, the DCI format 1_1, or the DCI format 2_3, the UE may send a PUSCH, a PUCCH, a PRACH, or an SRS on the group of symbol in the slot according to the indication.

The UE may receive a PDCCH.

If the UE is configured by a high layer to receive a PDSCH or a CSI-RS on the group of symbol in the slot, then the UE does not receive the PDSCH or the CSI-RS on the group of symbol in the slot.

If the UE is configured by a high layer to send an SRS, a PUCCH, a PUSCH, or a PRACH on the group of symbol in the slot, then the UE
  does not transmit the PUCCH, the PUSCH, or the PRACH on the slot, and does not transmit the SRS on a symbol in the group of symbols in the slot, starting from a symbol after a processing time $T_{proc,2}$ that meets PUSCH preparation after an end of UE detecting a last symbol of a CORESET in the DCI format 2_0.
  does not expect to cancel an SRS transmission, a PUCCH transmission, a PUSCH transmission, or a PRACH transmission on the symbol in the group of symbols in the slot, from an end of UE detecting a last symbol of a CORESET in the DCI format 2_0 to a processing time $T_{proc,2}$ that meets PUSCH preparation.

(e) The target time window includes a COT window initiated by the network device, wherein a third symbol group in a third slot is located outside the COT window.

In a possible implementation, if the terminal device is configured to receive a preconfigured downlink transmission on the third symbol group in the third slot, the terminal device cancels receiving the preconfigured downlink transmission on the third symbol group in the third slot, or the terminal device cancels receiving the preconfigured downlink transmission on the third slot.

In a possible implementation, if the terminal device is configured to send a preconfigured uplink transmission on the third symbol group in the third slot, the terminal device allows to send the preconfigured uplink transmission on the third symbol group in the third slot.

In a possible implementation, if the terminal device determines that a random access channel resource which is configured is located on the third symbol group in the third slot, the terminal device determines that the random access channel resource is a valid random access channel resource.

Optionally, the terminal device allows to send the preconfigured uplink transmission on the third symbol group in the third slot, specifically referring to that: if the terminal device obtains a right to use a channel on the third symbol group in the third slot, such as a channel detection (LBT) is successful, then the terminal device sends the preconfigured uplink transmission on the third symbol group in the third slot.

(f) The target time window includes a COT window initiated by the terminal device, wherein the COT window includes a fourth symbol group in a fourth slot.

In a possible implementation, if the terminal device is configured to receive a preconfigured downlink transmission on the fourth symbol group in the fourth slot, the terminal device cancels receiving the preconfigured downlink transmission on the fourth symbol group in the fourth slot, or the terminal device cancels receiving the preconfigured downlink transmission on the fourth slot.

In a possible implementation, if the terminal device is configured to send a preconfigured uplink transmission on the fourth symbol group in the fourth slot, the terminal device sends the preconfigured uplink transmission on the fourth symbol group in the fourth slot.

In a possible implementation, if the terminal device determines that a random access channel resource which is configured is located on the fourth symbol group in the fourth slot, the terminal device determines that the random access channel resource is a valid random access channel resource.

(g) The target time window includes a COT window initiated by the terminal device, wherein a fifth symbol group in a fifth slot is located outside the COT window.

In a possible implementation, if the terminal device is configured to receive a preconfigured downlink transmission on the fifth symbol group in the fifth slot, the terminal device allows to receive the preconfigured downlink transmission on the fifth symbol group in the fifth slot.

In a possible implementation, if the terminal device determines that a random access channel resource which is configured is located on the fifth symbol group in the fifth slot, the terminal device determines that the random access channel resource is a valid random access channel resource.

Optionally, the terminal device allows to receive the preconfigured downlink transmission on the fifth symbol group in the fifth slot, specifically referring to that: the terminal device detects whether there is a preconfigured downlink transmission sent by the network device on the fifth symbol group in the fifth slot.

Figure 4:
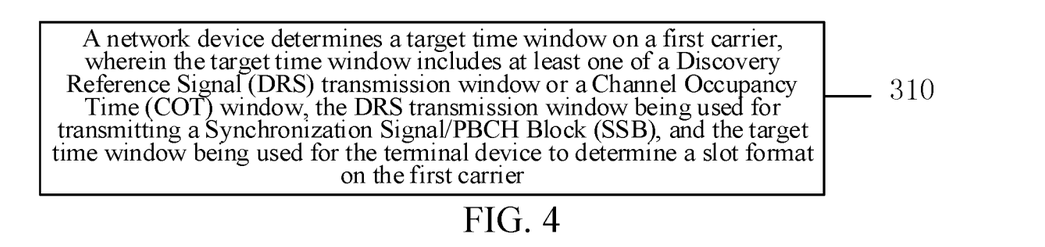
FIG. 4 is a schematic flowchart of a method 300 for determining a slot format according to an implementation of the present disclosure.

FIG. 4 is a schematic flowchart of a method 300 for determining a slot format according to an implementation of the present disclosure. The method described in FIG. 4 may be performed by a terminal device and a network device, the terminal device may be, for example, the terminal device 110 shown in FIG. 1, and the network device may be, for example, the network device 110 shown in FIG. 1. As shown in FIG. 3, the method 300 may include at least part of the following contents.

The network device determines a target time window on a first carrier, wherein the target time window includes at least one of a Discovery Reference Signal (DRS) transmission window or a Channel Occupancy Time (COT) window, wherein the DRS transmission window is used for transmitting a Synchronization Signal/PBCH Block (SSB), and the target time window is used for the terminal device to determine a slot format on the first carrier.

In 310, a network device determines a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB), and the target time window is used for the terminal device to determine a slot format on the first carrier.

Optionally, the network device sends first indication information to the terminal device, wherein the first indication information includes at least one of length indication information of the DRS transmission window or starting position indication information of the DRS transmission window.

Optionally, the network device sends second indication information to the terminal device, wherein the second indication information includes at least one of length indication information of the COT window, slot structure indication information, or channel access priority indication information corresponding to the COT, wherein a channel access priority corresponding to the COT is used for determining a length of the COT window.

It should be noted that, specifically for a specific function of first indication information sent by the network device to the terminal device, please refer to contents of implementations of the above terminal device, which will not be repeated here too much.

It should be understood that in the implementations of the present disclosure, the "first", the "second", and the "third", etc., are only for distinguishing different objects, but do not constitute a limitation on the scope of the implementations of the present disclosure.

In the implementation of the present disclosure, a terminal device determines a target time window on a first carrier, wherein the target time window includes at least one of a Discovery Reference Signal (DRS) transmission window or a Channel Occupancy Time (COT) window, and the terminal device determines a slot format on the first carrier according to the DRS transmission window and/or the COT window, so that a determination of a slot format in an NR-U system may be dynamically realized.

The preferred implementations of the present disclosure have been described in detail above with reference to the accompanying drawings. However, the present disclosure is not limited to specific details of the implementations described above, and multiple kinds of simple variations may be made to the technical solutions of the present disclosure within the technical conception scope of the present disclosure, and these simple variations are all within the protection scope of the present disclosure.

For example, various specific technical features described in the specific implementations described above may be combined in any suitable mode without conflict. In order to avoid unnecessary repetition, various possible combinations will not be further explained in the present disclosure.

For another example, various different implementations of the present disclosure may also be combined arbitrarily with each other, as long as they do not violate the idea of the present disclosure, and the combinations should be regarded as the contents disclosed in the present disclosure as well.

It should be understood that sequence numbers of the foregoing processes do not mean execution sequences in various method implementations of the present disclosure. The execution sequences of the processes should be determined according to functions and internal logics of the processes, and should not constitute any limitation on the implementation processes of the implementations of the present disclosure.

The methods for transmitting control information according to implementations of the present disclosure have been described in detail above, and communication apparatuses according to implementations of the present disclosure will be described below in combination with FIGS. 9 to 11. Technical features described in the method implementations are applicable to the following apparatus implementations.

Figure 5:
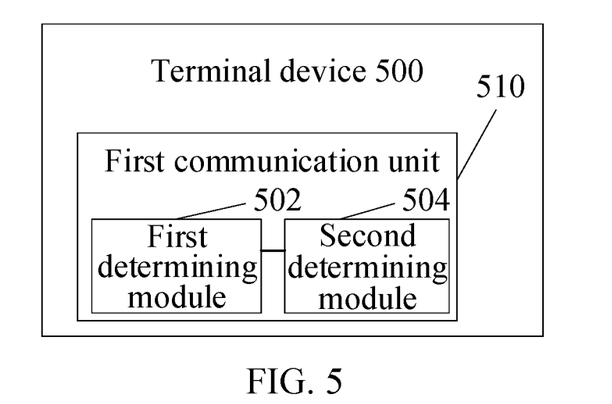
FIG. 5 is a schematic block diagram of a terminal device 500 according to an implementation of the present disclosure.

FIG. 5 shows a schematic block diagram of a terminal device 500 according to an implementation of the present disclosure. As shown in FIG. 5, the terminal device 500 includes a second determining module 504, wherein a first determining module 502 and the second determining module 504 are located in a first communication unit 510.

The first determining module 502 is configured to determine a target time window on a first carrier, wherein the target time window at least includes one of the following: a Discovery Reference Signal (DRS) transmission window or a Channel Occupancy Time (COT) window, the DRS transmission window being used for transmitting a Synchronization Signal/PBCH Block (SSB).

The second determining module 504 is configured to determine a slot format on the first carrier according to the target time window.

Optionally, in a case where the target time window includes the DRS transmission window, the first determining module is further configured to determine the DRS transmission window according to a preset rule; or, determine the DRS window according to received first indication information, wherein the first indication information includes at least one of length indication information of the DRS transmission window or starting position indication information of the DRS transmission window.

Optionally, in a case where the target time window includes the COT window, the first determining module is further configured to determine the COT window according to received second indication information, wherein the second indication information includes at least one of length indication information of the COT window, slot structure indication information, or channel access priority indication information corresponding to the COT, wherein a channel access priority corresponding to the COT is used for determining a length of the COT window.

Optionally, the target time window includes the DRS transmission window, and in a case where the target time window includes the DRS transmission window, the second determining module is further configured to perform at least one of the following operations: if the terminal device is configured to receive a preconfigured downlink transmission on the first symbol group in the first slot, canceling receiving the preconfigured downlink transmission on the first symbol group in the first slot, or the terminal device cancels receiving the preconfigured downlink transmission on the first slot; if the terminal device is configured to send a preconfigured uplink transmission on the first symbol group in the first slot, canceling sending the preconfigured uplink transmission on the first symbol group in the first slot, or the terminal device cancels sending the preconfigured uplink transmission on the first slot; if the terminal device determines that a random access channel resource which is configured is located on the first symbol group in the first slot, determining that the random access channel resource is not a valid random access channel resource; wherein the preconfigured downlink transmission includes at least one of a Channel State Information Reference Signal (CSI-RS) or a Physical Downlink Shared Channel (PDSCH), the preconfigured uplink transmission includes at least one of a Sounding Reference Signal (SRS), a Physical Uplink Control Channel (PUCCH), a Physical Uplink Shared Channel (PUSCH), or a Physical Random Access Channel (PRACH), and the random access channel resource includes at least one of a PRACH transmission opportunity or a PUSCH transmission opportunity.

Optionally, the target time window includes the DRS transmission window, and in a case where the target time window includes the DRS transmission window, the apparatus further includes a third determining module, configured to determine that the first symbol group or the first slot is not used for an SSB transmission; wherein the second determining module is further configured to perform at least one of the following operations: if the terminal device is configured to receive a preconfigured downlink transmission on the first symbol group in the first slot, receiving the preconfigured downlink transmission on the first symbol group in the first slot; if the terminal device is configured to send a preconfigured uplink transmission on the first symbol group in the first slot, allowing to send the preconfigured uplink transmission on the first symbol group in the first slot; if the terminal device determines that a random access channel resource which is configured is located on the first symbol group in the first slot, determining that the random access channel resource is a valid random access channel resource; wherein the preconfigured downlink transmission includes at least one of a CSI-RS or a PDSCH, the preconfigured uplink transmission includes at least one of an SRS, a PUCCH, a PUSCH, or a PRACH, and the random access channel resource includes at least one of a PRACH transmission opportunity or a PUSCH transmission opportunity.

Optionally, the target time window includes the DRS transmission window and the COT window, wherein the COT window is a COT window initiated by a network device, a first symbol group in a first slot is located within the DRS transmission window, but not within the COT, and the second determining module is further configured to perform at least one of the following operations: if the terminal device is configured to receive a preconfigured downlink transmission on the first symbol group in the first slot, canceling receiving the preconfigured downlink transmission on the first symbol group in the first slot, or the terminal device cancels receiving the preconfigured downlink transmission on the first slot; if the terminal device is configured to send a preconfigured uplink transmission on the first symbol group in the first slot, the preconfigured uplink transmission may be sent on the first symbol group in the first slot; if the terminal device determines that a random access channel resource which is configured is located on the first symbol group in the first slot, determining that the random access channel resource is a valid random access channel resource; wherein the preconfigured downlink transmission includes at least one of a CSI-RS or a PDSCH, the preconfigured uplink transmission includes at least one of an SRS, a PUCCH, a PUSCH, or a PRACH, and the random access channel resource includes at least one of a PRACH transmission opportunity or a PUSCH transmission opportunity.

Optionally, the target time window includes the COT window, wherein the COT window is a COT window initiated by a network device, the COT window includes a second symbol group in a second slot, and the second determining module is further configured to perform at least one of the following operations: if the terminal device is configured to receive a preconfigured downlink transmission on the second symbol group in the second slot, and the terminal device determines that symbols in the second symbol group are not downlink symbols, canceling receiving the preconfigured downlink transmission on the second symbol group in the second slot, or the terminal device cancels receiving the preconfigured downlink transmission on the second slot; if the terminal device is configured to receive a preconfigured downlink transmission on the second symbol group in the second slot, and the terminal device determines that symbols in the second symbol group are downlink symbols, receiving the preconfigured downlink transmission on the second symbol group in the second slot; if the terminal device is configured to send a preconfigured uplink transmission on the second symbol group in the second slot, and the terminal device determines that symbols in the second symbol group are not uplink symbols, canceling sending the preconfigured uplink transmission on the second symbol group in the second slot, or canceling sending the preconfigured uplink transmission on the second slot; if the terminal device is configured to send a preconfigured uplink transmission on the second symbol group in the second slot, and the terminal device determines that symbols in the second symbol group are uplink symbols, allowing to send the preconfigured uplink transmission on the second symbol group in the second slot; if the terminal device determines that a random access channel resource which is configured is located on the second symbol group in the second slot, and the terminal device determines that symbols in the second symbol group are not uplink symbols, determining that the random access channel resource is not a valid random access channel resource; if the terminal device determines that a random access channel resource which is configured is located on the second symbol group in the second slot, and the terminal device determines that symbols in the second symbol group are uplink symbols, determining that the random access channel resource is a valid random access channel resource; wherein the preconfigured downlink transmission includes at least one of a CSI-RS or a PDSCH, the preconfigured uplink transmission includes at least one of an SRS, a PUCCH, a PUSCH, or a PRACH, and the random access channel resource includes at least one of a PRACH transmission opportunity or a PUSCH transmission opportunity.

Optionally, a fourth determining module is configured to determine a symbol type of the second symbol group, according to slot structure indication information sent by the network device, wherein the symbol type of the second symbol group includes one of the following: an uplink symbol, a downlink symbol, or a flexible symbol.

Optionally, the target time window includes the COT window, wherein the COT window is a COT window initiated by a network device, a third symbol group in a third slot is located outside the COT window, and the second determining module is further configured to perform at least one of the following operations: if the terminal device is configured to receive a preconfigured downlink transmission on the third symbol group in the third slot, canceling receiving the preconfigured downlink transmission on the third symbol group in the third slot, or the terminal device cancels receiving the preconfigured downlink transmission on the third slot; if the terminal device is configured to send a preconfigured uplink transmission on the third symbol group in the third slot, allowing to send the preconfigured uplink transmission on the third symbol group in the third slot; if the terminal device determines that a random access channel resource which is configured is located on the third symbol group in the third slot, determining that the random access channel resource is a valid random access channel resource; wherein the preconfigured downlink transmission includes at least one of a CSI-RS or a PDSCH, the preconfigured uplink transmission includes at least one of an SRS, a PUCCH, a PUSCH, or a PRACH, and the random access channel resource includes at least one of a PRACH transmission opportunity or a PUSCH transmission opportunity.

Optionally, the target time window includes the COT window, wherein the COT window is a COT window initiated by the terminal device, the COT window includes a fourth symbol group in a fourth slot, and the second determining module is further configured to perform at least one of the following operations: if the terminal device is configured to receive a preconfigured downlink transmission on the fourth symbol group in the fourth slot, canceling receiving the preconfigured downlink on the fourth symbol group in the fourth slot, or the terminal device cancels receiving the preconfigured downlink transmission on the fourth slot; if the terminal device is configured to send a preconfigured uplink transmission on the fourth symbol group in the fourth slot, sending the preconfigured uplink transmission on the fourth symbol group in the fourth slot; wherein the preconfigured downlink transmission includes at least one of a CSI-RS or a PDSCH, and the preconfigured uplink transmission includes at least one of an SRS, a PUCCH, a PUSCH, or a PRACH.

Optionally, the target time window includes the COT window, wherein the COT window is a COT window initiated by the terminal device, a fifth symbol group in a fifth slot is located outside the COT window, and the second determining module is further configured to perform at least one of the following operations: if the terminal device is configured to receive a preconfigured downlink transmission on the fifth symbol group in the fifth slot, allowing to receive the preconfigured downlink transmission on the fifth symbol group in the fifth slot; wherein the preconfigured downlink transmission includes at least one of a CSI-RS or a PDSCH.

Figure 6:
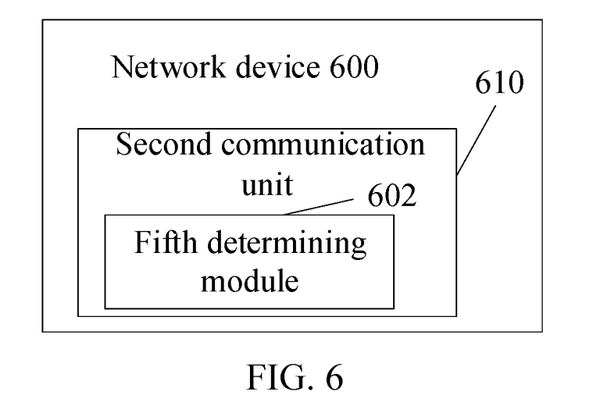
FIG. 6 is a schematic block diagram of a network device 600 according to an implementation of the present disclosure.

FIG. 6 shows a schematic block diagram of a network device 600 according to an implementation of the present disclosure. As shown in FIG. 6, the network device 600 includes: a fifth determining module 602, wherein the fifth determining module 602 is located in a second communication unit 610.

The fifth determining module 602 is configured to determine a target time window on a first carrier, wherein the target time window includes at least one of a Discovery Reference Signal (DRS) transmission window or a Channel Occupancy Time (COT) window, the DRS transmission window being used for transmitting a Synchronization Signal/PBCH Block (SSB), and the target time window is used for the terminal device to determine a slot format on the first carrier.

Optionally, a sending module is configured to send first indication information to the terminal device, wherein the first indication information includes at least one of length indication information of the DRS transmission window or starting position indication information of the DRS transmission window.

Optionally, the network device sends second indication information to the terminal device, wherein the second indication information includes at least one of length indication information of the COT window, slot structure indication information, or channel access priority indication information corresponding to the COT, wherein a channel access priority corresponding to the COT is used for determining a length of the COT window.

Figure 7:
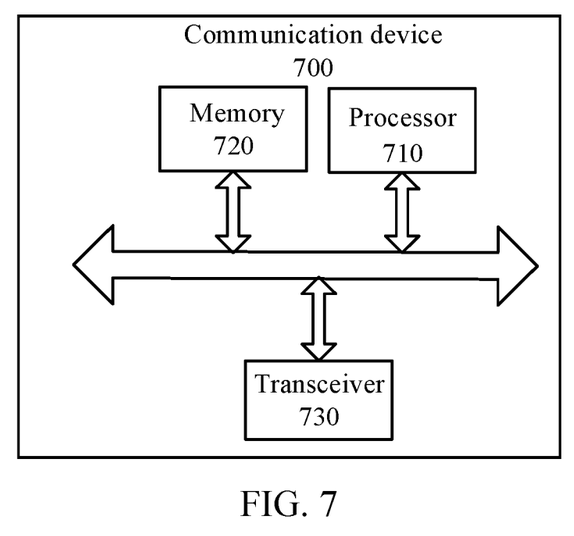
FIG. 7 is a schematic diagram of a structure of a communication device 700 according to an implementation of the present disclosure.

FIG. 7 is a schematic diagram of a structure of a communication device 700 according to an implementation of the present disclosure. The communication device 700 shown in FIG. 7 includes a processor 710, wherein the processor 710 may call and run a computer program from a memory to implement the methods in the implementations of the present disclosure.

Optionally, as shown in FIG. 7, the communication device 700 may further include a memory 720. Herein, the processor 710 may call and run a computer program from the memory 720 to implement the methods in the implementations of the present disclosure.

Herein, the memory 720 may be one separate device independent of the processor 710, or may be integrated in the processor 710.

Optionally, as shown in FIG. 7, the communication device 700 may further include a transceiver 730, wherein the processor 710 may control the transceiver 730 to communicate with another device. Specifically, information or data may be may sent to another device, or information or data sent by another device may be received.

Herein, the transceiver 730 may include a transmitter and a receiver. The transceiver 730 may further include antennas, wherein a quantity of the antennas may be one or more.

Optionally, the communication device 700 may be specifically the network device according to the implementations of the present disclosure, and the communication device 700 may implement the corresponding processes implemented by the network device in various methods in the implementations of the present disclosure, which will not be repeated here again for brevity.

Optionally, the communication device 700 may be specifically the terminal device according to the implementations of the present disclosure, and the communication device 700 may implement the corresponding processes implemented by the terminal device in various methods in the implementations of the present disclosure, which will not be repeated here again for brevity.

Figure 8:
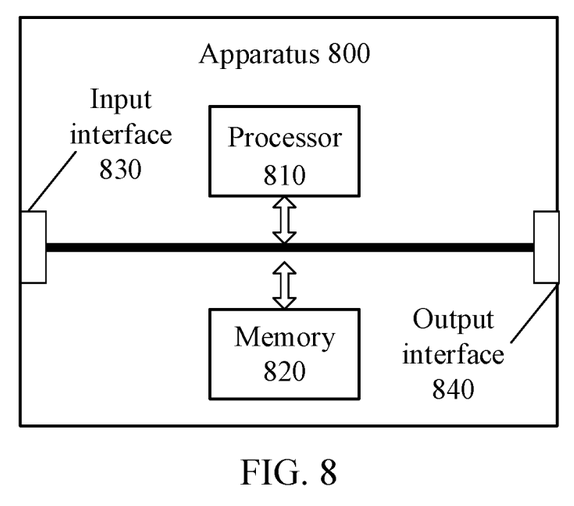
FIG. 8 is a schematic diagram of a structure of an apparatus according to an implementation of the present disclosure.

FIG. 8 is a schematic diagram of a structure of an apparatus according to an implementation of the present disclosure. The apparatus 800 shown in FIG. 8 includes a processor 810. The processor 810 may call and run a computer program from a memory to implement the methods in the implementations of the present disclosure.

Optionally, as shown in FIG. 8, the apparatus 800 may further include a memory 820. Herein, the processor 810 may call and run a computer program from the memory 820 to implement the methods in the implementations of the present disclosure.

Herein, the memory 820 may be one separate device independent of the processor 810, or may be integrated in the processor 810.

Optionally, the apparatus 800 may further include an input interface 830. Herein, the processor 810 may control the input interface 830 to communicate with another device or chip. Specifically, information or data sent by another device or chip may be acquired.

Optionally, the apparatus 800 may further include an output interface 840. Herein, the processor 810 may control the output interface 840 to communicate with another device or chip. Specifically, information or data may be outputted to another device or chip.

Optionally, the apparatus may be applied to the terminal device in the implementations of the present disclosure, and the apparatus may implement the corresponding processes implemented by the terminal device in various methods according to the implementations of the present disclosure, which will not be repeated here again for brevity.

Optionally, the apparatus may be applied to the network device in the implementations of the present disclosure, and the apparatus may implement the corresponding processes implemented by the network device in various methods according to the implementations of the present disclosure, which will not be repeated here again for brevity.

Optionally, the apparatus 800 may be a chip. It should be understood that the chip mentioned in the implementations of the present disclosure may also be referred to as a system-level chip, a system chip, a chip system, or a system chip on chip, etc.

It should be understood that the processor in the implementations of the present disclosure may be an integrated circuit chip with a capability for processing signals. In an implementation process, the acts of the method implementations described above may be completed by integrated logic circuits of hardware in the processor, or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. Various methods, acts and logic block diagrams disclosed in implementations of the present disclosure may be implemented or executed. The general purpose processor may be a microprocessor, or the processor may be any conventional processor, or the like. The acts of the method disclosed in connection with the implementation of the present disclosure may be directly embodied as being executed and completed by a hardware decoding processor, or being executed and completed by a combination of hardware and software modules in the decoding processor. The software modules may be located in a storage medium commonly used in the art, such as a random memory, a flash memory, a read-only memory, a programmable read-only memory, or an electrically erasable programmable memory, or a register, etc. The storage medium is located in a memory, wherein the processor reads information in the memory, and completes the acts of the above method in combination with its hardware.

It should be understood that the memory in implementations of the present disclosure may be a transitory memory, or non-transitory memory, or may include both transitory and non-transitory memories. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which serves as an external cache. By an illustrative, but not a restriction description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), or a Direct Rambus RAM (DR RAM). It should be noted that the memories of the systems and the methods described herein are intended to include, but are not limited to, these and any other suitable types of memories.

It should be understood that, the foregoing memory is an illustrative, but not a restriction description. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, the memories in the implementations of the present disclosure are intended to include, but are not limited to, these and any other suitable types of memories.

Figure 9:
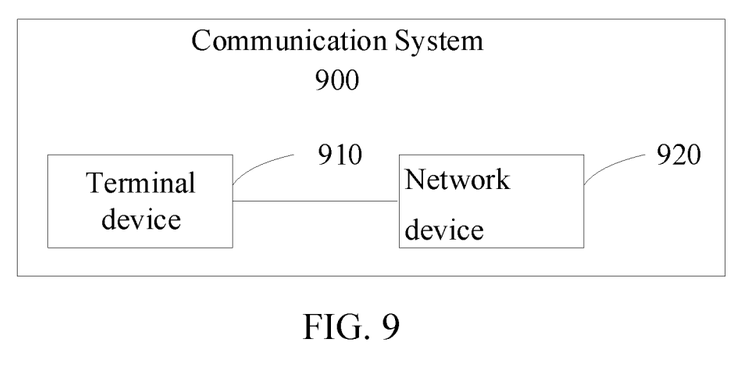
FIG. 9 is a schematic block diagram of a communication system 900 according to an implementation of the present disclosure.

FIG. 9 is a schematic block diagram of a communication system 900 provided by an implementation of the present disclosure. As shown in FIG. 9, the communication system 900 includes a terminal device 910 and a network device 920.

Herein, the terminal device 910 may be configured to implement the corresponding functions implemented by the terminal device in the above-mentioned methods, and the network device 920 may be configured to implement the corresponding functions implemented by the network device in the above-mentioned methods, which will not be repeated here for brevity.

An implementation of the present disclosure further provides a computer readable storage medium, configured to store a computer program.

Optionally, the computer readable storage medium may be applied to the terminal device in the implementations of the present disclosure, and the computer program causes a computer to perform the corresponding processes implemented by the terminal device in various methods according to the implementations of the present disclosure, which will not be repeated here again for brevity.

Optionally, the computer readable storage medium may be applied to the network device in the implementations of the present disclosure, and the computer program causes the computer to perform the corresponding processes implemented by the network device in various methods according to the implementations of the present disclosure, which will not be repeated here again for brevity.

An implementation of the present disclosure further provides a computer program product, including computer program instructions.

Optionally, the computer program product may be applied to the terminal device in the implementations of the present disclosure, and the computer program instructions cause the computer to perform the corresponding processes implemented by the terminal device in various methods according to the implementations of the present disclosure, which will not be repeated here again for brevity.

Optionally, the computer program product may be applied to the network device in the implementations of the present disclosure, and the computer program instructions cause the computer to perform the corresponding processes implemented by the network device in various methods according to the implementations of the present disclosure, which will not be repeated here again for brevity.

An implementation of the present disclosure further provides a computer program.

Optionally, the computer program may be applied to the terminal device in the implementations of the present disclosure, and when the computer program is run on a computer, the computer is caused to perform the corresponding processes implemented by the terminal device in various methods according to the implementations of the present disclosure, which will not be repeated here again for brevity.

Optionally, the computer program may be applied to the network device in the implementations of the present disclosure. When the computer program is run on a computer, the computer is caused to perform the corresponding processes implemented by the network device in various methods according to the implementations of the present disclosure, which will not be repeated here again for brevity.

Those of ordinary skill in the art may recognize that the exemplary units and algorithm acts described in connection with the implementations disclosed herein can be implemented in electronic hardware, or a combination of computer software and electronic hardware. Whether these functions are performed in hardware or software depends on a specific application and design constraint condition of the technical solution. Skilled in the art may use different methods to realize the described functions for each particular application, but such realizations should not be considered to be beyond the scope of the present disclosure.

Those skilled in the art may clearly understand that for convenience and conciseness of description, the specific working processes of the systems, the apparatuses, and the units described above may refer to the corresponding processes in the aforementioned method implementations, which will not be repeated here again.

In several implementations provided by the present disclosure, it should be understood that the disclosed systems, apparatuses, and methods may be implemented in another mode. For example, the apparatus implementations described above are only illustrative, for example, a division of the units is only a logical function division, and there may be another division mode in an actual realization, for example, multiple units or components may be combined or integrated into another system, or some features may be ignored, or not executed. At another point, the mutual coupling or direct coupling or a communication connection shown or discussed may be indirect coupling or a communication connection through some interfaces, apparatuses, or units, and may be in an electrical, mechanical, or another form.

The units described as separated components may or may not be physically separated, and the component shown as a unit may or may not be a physical unit, i.e., it may be located in one place, or may be distributed over multiple network units. Part or all of the units may be selected according to a practical need to achieve a purpose of the solution of the present implementation.

In addition, various functional units in various implementations of the present disclosure may be integrated in one processing unit, or it may be that various units exist physically separately, or two or more units may be integrated in one unit.

The functions may be stored in one computer readable storage medium, if implemented in a form of a software functional unit, and sold or used as a separate product. Based on such understanding, the technical solution of the present disclosure, in essence, or the part contributing to the existing art, or the part of the technical solution, may be embodied in a form of a software product stored in one storage medium, including several instructions for causing one computer device (which may be a personal computer, a server, or a network device, etc.) to perform all or part of the acts of the methods described in various implementations of the present disclosure. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely exemplary implementations of the present disclosure, but the protection scope of the present disclosure is not limited thereto. Any person skilled in the art may easily conceive variations or substitutions within the technical scope disclosed by the present disclosure, which should all be included within the protection scope of the present disclosure. Therefore, the protection scope of the present disclosure should be subject to the protection scope of the claims.

What is claimed is:

1. A method for determining a slot format, comprising:
    determining, by a terminal device, a target time window on a first carrier, wherein the target time window comprises a Channel Occupancy Time (COT) window; and
    determining, by the terminal device, a slot format on the first carrier according to the target time window;
    wherein the target time window comprises the COT window, the COT window is a COT window initiated by a network device, and the COT window comprises a second symbol group in a second slot, and determining, by the terminal device, the slot format on the first carrier according to the target time window, comprises:
    receiving, by the terminal device, at least one of a Channel State Information Reference Signal (CSI-RS) and a Physical Downlink Shared Channel (PDSCH) on the second symbol group in the second slot, if the terminal device is configured to receive at least one of the CSI-RS and the PDSCH on the second symbol group in the second slot and the terminal device determines that a symbol in the second symbol group is a downlink symbol;
    or
    wherein the target time window comprises the COT window, the COT window is a COT window initiated by a network device, and a third symbol group in a third slot is located outside the COT window, and determining, by the terminal device, the slot format on the first carrier according to the target time window, comprises:
    canceling, by the terminal device, receiving a Channel State Information Reference Signal (CSI-RS) on the third symbol group in the third slot, or canceling, by the terminal device, receiving the preconfigured downlink transmission on the third slot, if the terminal device is configured to receive the CSI-RS on the third symbol group in the third slot.

2. The method of claim 1, wherein the target time window comprises the COT window, and determining, by the terminal device, the target time window on the first carrier, comprises:
    determining, by the terminal device, the COT window according to received second indication information, wherein the second indication information comprises at least one of length indication information of the COT window and slot structure indication information.

3. The method of claim 1, further comprising:
    determining, by the terminal device, a symbol type of the second symbol group according to slot structure indication information sent by the network device, wherein the symbol type of the second symbol group comprises a downlink symbol.

4. An apparatus for determining a slot format, located in a terminal device, comprising: a processor and a transceiver, wherein
    the processor is configured to determine a target time window on a first carrier, wherein the target time window comprises a Channel Occupancy Time (COT) window; and
    determine a slot format on the first carrier according to the target time window;
    wherein the target time window comprises the COT window, the COT window is a COT window initiated by a network device, and the COT window comprises a second symbol group in a second slot, and the processor is further configured to perform the following operation:
    receiving at least one of a Channel State Information Reference Signal (CSI-RS) and a Physical Downlink Shared Channel (PDSCH) on the second symbol group in the second slot, if the terminal device is configured to receive at least one of the CSI-RS and the PDSCH on the second symbol group in the second slot and the terminal device determines that a symbol in the second symbol group is a downlink symbol;
    or
    wherein the target time window comprises the COT window, the COT window is a COT window initiated by a network device, and a third symbol group in a third slot is located outside the COT window, and the processor is further configured to perform the following operation:
    canceling receiving a Channel State Information Reference Signal (CSI-RS) on the third symbol group in the third slot, if the terminal device is configured to receive the CSI-RS on the third symbol group in the third slot.

5. The apparatus of claim 4, wherein in a case where the target time window comprises the COT window, the processor is further configured to:
   determine the COT window according to received second indication information, wherein the second indication information comprises at least one of length indication information of the COT window and slot structure indication information.

6. The apparatus of claim 4, wherein the processor is further configured to determine a symbol type of the second symbol group according to slot structure indication information sent by the network device, wherein the symbol type of the second symbol group comprises a downlink symbol.

7. An apparatus for determining a slot format, located in a network device, comprising: a processor and a transceiver, wherein
   the processor is configured to determine a target time window on a first carrier, wherein the target time window comprises a Channel Occupancy Time (COT) window, and the target time window is used for a terminal device to determine the slot format on the first carrier;
   wherein the COT window is a COT window initiated by a network device, and the COT window comprises a second symbol group in a second slot, and the processor is further configured to perform the following operation:
   transmitting at least one of a Channel State Information Reference Signal (CSI-RS) and a Physical Downlink Shared Channel (PDSCH) on the second symbol group in the second slot, if a terminal device is configured to receive at least one of the CSI-RS and the PDSCH on the second symbol group in the second slot and the terminal device determines that a symbol in the second symbol group is a downlink symbol;
   or
   wherein the COT window is a COT window initiated by the network device, and a third symbol group in a third slot is located outside the COT window, and the processor is further configured to perform the following operation:
   canceling transmitting a Channel State Information Reference Signal (CSI-RS) on the third symbol group in the third slot, if the terminal device is configured to receive the CSI-RS on the third symbol group in the third slot.

8. The apparatus of claim 7, wherein the transceiver is configured to send second indication information to the terminal device, wherein the second indication information comprises at least one of length indication information of the COT window and slot structure indication information.

* * * * *